United States Patent
Ivory et al.

(10) Patent No.: US 11,017,152 B2
(45) Date of Patent: *May 25, 2021

(54) OPTIMIZING LOADING OF WEB PAGE BASED ON AGGREGATED USER PREFERENCES FOR WEB PAGE ELEMENTS OF WEB PAGE

(71) Applicant: International Business Machines Corporation, Armonk, NY (US)

(72) Inventors: Andrew J. Ivory, Raleigh, NC (US); Todd E. Kaplinger, Raleigh, NC (US); Aaron K. Shook, Raleigh, NC (US); David M. Stecher, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,193

(22) Filed: Jul. 12, 2019

(65) Prior Publication Data

US 2019/0332653 A1    Oct. 31, 2019

Related U.S. Application Data

(63) Continuation of application No. 13/911,953, filed on Jun. 6, 2013, now Pat. No. 10,803,232.

(51) Int. Cl.
*G06F 40/14* (2020.01)
*G06F 16/957* (2019.01)
(Continued)

(52) U.S. Cl.
CPC .......... *G06F 40/14* (2020.01); *G06F 16/9035* (2019.01); *G06F 16/957* (2019.01);
(Continued)

(58) Field of Classification Search
CPC ...... G06F 40/137; G06F 40/14; G06F 16/957; G06F 16/9574; G06F 16/958;
(Continued)

(56) References Cited

U.S. PATENT DOCUMENTS

| 5,708,845 A | 1/1998 | Wistendahl et al. |
| 6,456,600 B1 | 9/2002 | Rochberger et al. |

(Continued)

FOREIGN PATENT DOCUMENTS

| CA | 2411142 A1 | 12/2001 |
| CA | 2752898 A1 | 3/2012 |

(Continued)

OTHER PUBLICATIONS

Office Action for U.S. Appl. No. 13/913,535 dated May 14, 2020, pp. 1-23.

(Continued)

*Primary Examiner* — Chau T Nguyen
(74) *Attorney, Agent, or Firm* — Robert A. Voigt, Jr.; Winstead PC

(57) ABSTRACT

A method, system and computer program product for optimizing the loading of a web page. The server receives indications (e.g., Document Object Model (DOM) elements) of web page elements of interest of a web page from multiple client devices. The server updates a list of web page elements for the requested web page that is sorted in terms of popularity based on these received indications of web page elements of interest. The server may then appropriately respond to a request to retrieve that web page by accessing such a list and transmitting to the browser of the requesting client device the data to populate the content of the web page elements for the requested web page in an order based on the sorted list. In this manner, the browser will be able to optimize the loading of the web page.

20 Claims, 7 Drawing Sheets

(51) Int. Cl.
  *G06F 16/958* (2019.01)
  *G06F 40/137* (2020.01)
  *G06F 16/9035* (2019.01)
  *G06F 16/9535* (2019.01)

(52) U.S. Cl.
  CPC ........ *G06F 16/958* (2019.01); *G06F 16/9535* (2019.01); *G06F 16/9574* (2019.01); *G06F 40/137* (2020.01); *G06F 2201/875* (2013.01)

(58) Field of Classification Search
  CPC .................. G06F 16/156; G06F 16/635; G06F 16/90348; G06F 16/95; G06F 16/9535; G06F 16/9035; G06F 2201/875
  See application file for complete search history.

(56) References Cited

U.S. PATENT DOCUMENTS

| | | | |
|---|---|---|---|
| 7,412,644 B2 | 8/2008 | Kieffer | |
| 7,581,170 B2 | 8/2009 | Baumgartner et al. | |
| 8,037,484 B2 | 10/2011 | Backhouse et al. | |
| 8,225,195 B1 | 7/2012 | Bryar et al. | |
| 8,886,799 B1 | 11/2014 | Zhang et al. | |
| 9,064,028 B2 | 6/2015 | Shen et al. | |
| 9,183,258 B1* | 11/2015 | Taylor | G06F 16/24578 |
| 9,477,376 B1 | 10/2016 | Stout et al. | |
| 9,524,284 B2* | 12/2016 | Hauser | G06F 40/174 |
| 2002/0075302 A1 | 6/2002 | Simchik | |
| 2005/0086344 A1 | 4/2005 | Suesserman | |
| 2005/0097008 A1 | 5/2005 | Ehring et al. | |
| 2005/0203884 A1* | 9/2005 | Allen | G06F 16/9535 |
| 2006/0123042 A1 | 6/2006 | Xie et al. | |
| 2007/0150838 A1* | 6/2007 | Moser | G06F 8/33 715/822 |
| 2008/0033982 A1 | 2/2008 | Parikh et al. | |
| 2008/0168045 A1 | 7/2008 | Suponau et al. | |
| 2008/0307308 A1 | 12/2008 | Sullivan et al. | |
| 2009/0043732 A1 | 2/2009 | Lee | |
| 2009/0158166 A1 | 6/2009 | Dewar et al. | |
| 2009/0287657 A1 | 11/2009 | Bennett | |
| 2009/0287683 A1 | 11/2009 | Bennett | |
| 2009/0287824 A1 | 11/2009 | Fisher et al. | |
| 2010/0083172 A1 | 4/2010 | Breeds et al. | |
| 2010/0287013 A1* | 11/2010 | Hauser | G06F 3/03543 705/7.37 |
| 2010/0287028 A1* | 11/2010 | Hauser | G06Q 30/02 705/7.29 |
| 2011/0022943 A1* | 1/2011 | Bou-Ghannam | G06F 16/9574 715/234 |
| 2011/0029641 A1 | 2/2011 | Fainberg et al. | |
| 2011/0055314 A1 | 3/2011 | Rosenstein et al. | |
| 2011/0055740 A1 | 3/2011 | Coleman et al. | |
| 2011/0066977 A1 | 3/2011 | DeLuca et al. | |
| 2011/0173216 A1 | 7/2011 | Newman et al. | |
| 2011/0197124 A1* | 8/2011 | Garaventa | G06F 16/972 715/234 |
| 2011/0202424 A1 | 8/2011 | Chun et al. | |
| 2012/0179564 A1* | 7/2012 | Soroca | G06Q 30/08 705/26.3 |
| 2012/0257560 A1 | 10/2012 | Srinivasan et al. | |
| 2013/0007590 A1 | 1/2013 | Rivera et al. | |
| 2013/0031459 A1 | 1/2013 | Khorashadi et al. | |
| 2013/0135344 A1* | 5/2013 | Stirbu | G06F 16/972 345/629 |
| 2013/0155463 A1* | 6/2013 | Jin | G06F 40/221 358/1.15 |
| 2013/0212465 A1 | 8/2013 | Kovatch | |
| 2013/0214995 A1 | 8/2013 | Lewin et al. | |
| 2013/0262983 A1 | 10/2013 | Richter et al. | |
| 2013/0275577 A1* | 10/2013 | Lim | G06F 16/9577 709/224 |
| 2013/0332815 A1 | 12/2013 | Gallo et al. | |
| 2013/0339490 A1 | 12/2013 | Tejomurtula et al. | |
| 2014/0188814 A1 | 7/2014 | Venkatrao et al. | |
| 2014/0222586 A1 | 8/2014 | Feldman et al. | |
| 2014/0229919 A1* | 8/2014 | Spiridonov | G06F 40/14 717/125 |

FOREIGN PATENT DOCUMENTS

| | | |
|---|---|---|
| CN | 1398377 A | 2/2003 |
| JP | 2005506593 A | 3/2005 |
| JP | 2009230536 A | 10/2009 |
| JP | 2010287202 A | 12/2010 |
| JP | 2012088790 A | 5/2012 |
| JP | 2014525103 B2 | 9/2014 |
| JP | 2015513144 A | 4/2015 |
| JP | 2016163537 A | 9/2016 |
| WO | 2005091952 A2 | 10/2005 |
| WO | 2009111051 A1 | 9/2009 |

OTHER PUBLICATIONS

Office Action for U.S. Appl. No. 13/911,953 dated May 14, 2020, pp. 1-24.
Examination Report from the Intellectual Property Office of the United Kingdom for Great Britain Application No. GB1521614.6 dated Feb. 4, 2016, pp. 1-5.
James Burke, "Simplicity and JavaScript Modules," Jan. 11, 2012, http://tagneto.blogspot.com/2012/01 /simplicity-and-javascript-modules.html (last visited on Apr. 30, 2015), pp. 1-12, see pp. 1, 2 and 5.
International Search Report for International Application No. PCT/CA2014/050445 dated Sep. 3, 2014, pp. 1-5.
Written Opinion for International Application No. PCT/CA2014/050445 dated Sep. 3, 2014, pp. 1-6.
DEACONSWORLD, "Changing the Load Order of a Webpage," http://www.deaconsworld.org.uk/2007/04/23/changing-the-load-order-of-a-webpage, Apr. 23, 2007, pp. 1-2.
asp.net, "Page Element Load Order—How do I Prioritize Content Place Holders for Faster Load," http://forums.asp.net/t/1587098.aspx/1, Oct. 1, 2010, pp. 1-4.
IBM, "HTML5 Code Example: Intelligently Store Images in ocalStorage for Faster Page Loads," https://www.ibm.com/developerworks/mydeveloperworks/blogs/bobleah/entry/html5_code_example_store_images_using_localstorage57?lang=en, Jan. 29, 2011, pp. 1-3.
Gill, Rawld, "The Dojo Loader," http://livedocs.dojotoolkit.org/loader/amd, 2012, pp. 1-23.
Digitalpoint, "How do I Change the Load Order of my Page," https://forums.digitalpoint.com/threads/how-do-i-change-the-load-order-of-my-page.1862381, Jul. 6, 2010, pp. 1-2.
Anonymous, "System and Method of Searching Keywords from Serial Web Pages," http://priorartdatabase.com, IPCOM/000215216, Feb. 22, 2012, pp. 1-4.
IPCOM000198571D, "System and Method for Record and Replay of Web-based Mobile Tasks," http://priorartdatabase.com, IPCOM/000198571, Aug. 9, 2010, pp. 1-33.
Office Action for U.S. Appl. No. 13/913,585 dated Oct. 31, 2019, pp. 1-18.
Office Action for U.S. Appl. No. 13/911,953 dated Oct. 31, 2019, pp. 1-18.
Office Action for U.S. Appl. No. 16/510,353 dated Jun. 1, 2020, pp. 1-34.
Office Action for U.S. Appl. No. 16/510,353 dated Nov. 12, 2020, pp. 1-18.

* cited by examiner

_US 11,017,152 B2_

OPTIMIZING LOADING OF WEB PAGE BASED ON AGGREGATED USER PREFERENCES FOR WEB PAGE ELEMENTS OF WEB PAGE

TECHNICAL FIELD

The present invention relates generally to web pages, and more particularly to optimizing the loading of a web page based on the aggregated user preferences for the web page elements of the web page.

BACKGROUND

A web page is a web document or other web resource that is suitable for the World Wide Web and can be accessed through a web browser and displayed on a user's computing device display. Web pages may be retrieved by the web browser from a remote server, commonly referred to as a "web server." The retrieved web page may in the form of a HyperText Markup Language (HTML) document, which is read and parsed by the browser, such as into the "Document Object Model" tree structure. The browser then loads the elements of the web page (e.g., images) from the web server, such as based on the order that the elements appear in the HTML document. As a result, the user may have to wait for the entire web page to be loaded before the user can see the information they are interested in the web page. For example, when the user accesses a website for a local news television station, the user may only be interested in viewing information regarding the weather and local news. However, the user may have to wait for the entire web page to be loaded before they can view the information regarding the weather and local news if these elements are loaded last.

Such a problem is compounded by mobile computing devices, which have slower processing speeds and less memory thereby taking longer to download a web page from a web server and increasing the length of time in which the user may have to wait to view the information of interest.

As a result, the current means for loading a web page may cause the user to wait for the entire web page to be loaded, which can be a significant amount of time depending on the connection speed, prior to viewing the information of interest.

SUMMARY

In one embodiment of the present invention, a method for optimizing the loading of a web page comprises receiving a request to retrieve a web page from a computing device of a user. The method further comprises accessing a list of web page elements for the requested web page that is sorted in terms of popularity. The method additionally comprises transmitting data to the computing device of the user to populate content of the web page elements of the requested web page in an order based on the sorted list.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for optimizing the loading of a web page. In one embodiment of the present invention, the server receives indications (e.g., Document Object Model (DOM) elements) of web page elements of interest of a web page from multiple client devices. The server updates a list of web page elements for the requested web page that is sorted in terms of popularity based on these received indications of web page elements of interest. Upon establishing a list that reflects the most requested web page elements for the web page, the server may appropriately respond to a request to retrieve the web page by accessing such a list and transmitting to the browser of the requesting client device the data to populate the content of the web page elements for the requested web page in an order based on the sorted list. In this manner, the server will be able to transmit to the browser of the requesting client device the data to populate the content of the elements of the requested web page that are higher in interest prior to those of lower in interest thereby optimizing the loading of the web page (i.e., possibly reducing the waiting time for the user to view the element(s) of interest in the requested web page).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
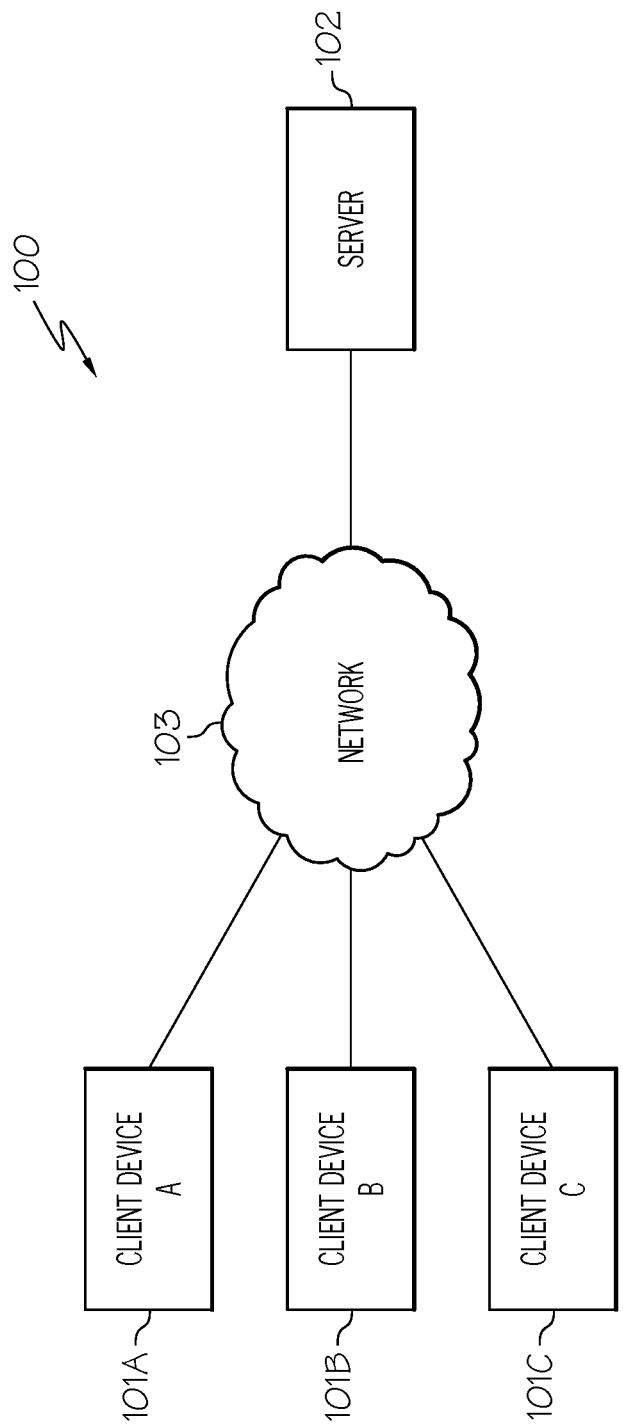
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. A description of the hardware configuration of client 101 is provided below in connection with FIG. 2.

In one embodiment, server 102 may be a web server configured to host websites. In one embodiment, server 102 is configured to transmit the data to populate the content of the elements of a web page to a browser of client device 101 in a particular order based on the relative priority of the elements of the web page as discussed further herein. A description of the hardware configuration of server 102 is provided below in connection with FIG. 3.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates three clients 101A-101C and a single server 102, network system 100 may include any number of clients 101 and servers 102. The embodiments of network system 100 are not to be limited in scope to the depiction of FIG. 1.

Figure 2:
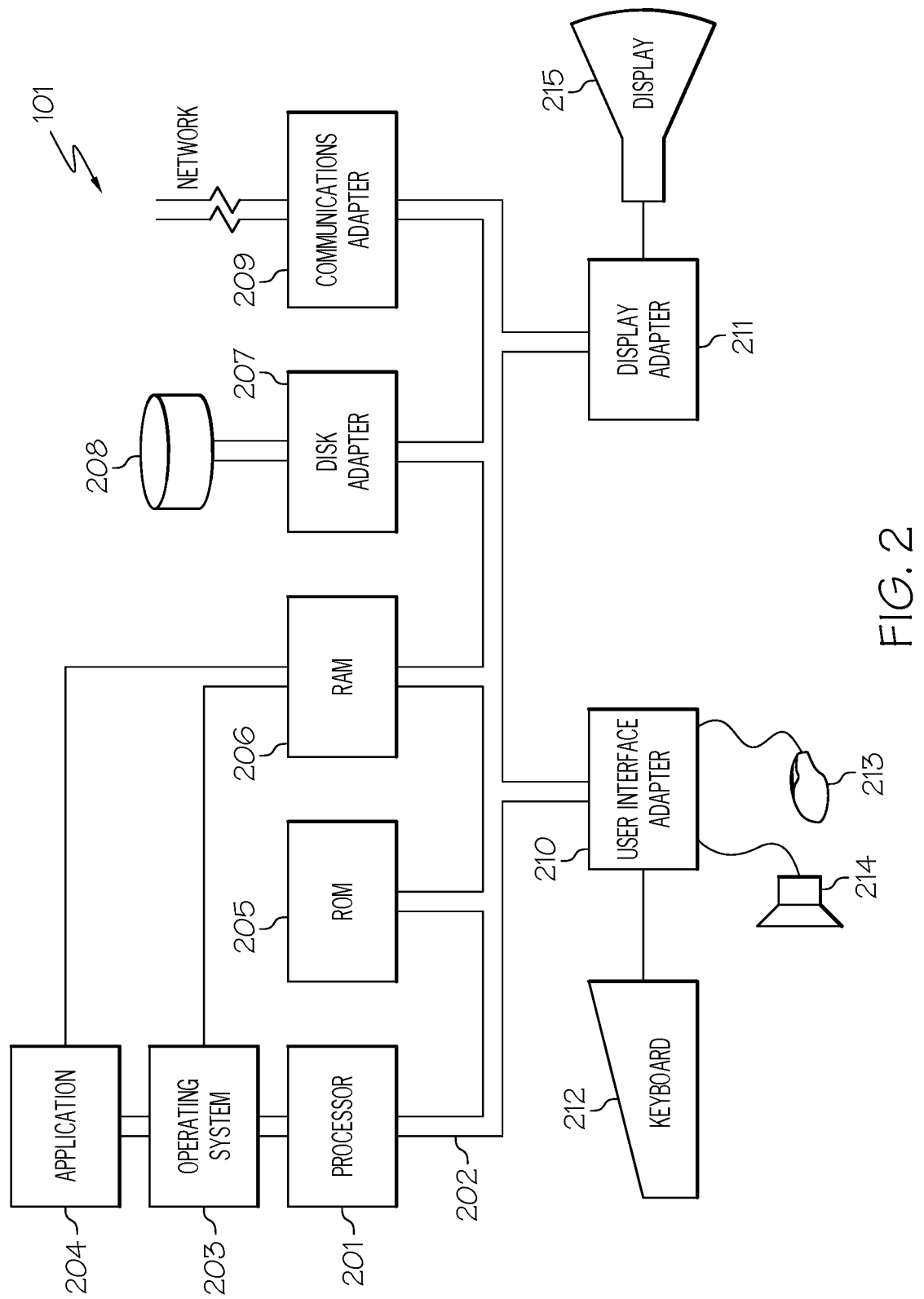
FIG. 2 illustrates a hardware configuration of a client device in accordance with an embodiment of the present invention.

Referring now to FIG. 2, FIG. 2 illustrates a hardware configuration of client 101 (FIG. 1) which is representative of a hardware environment for practicing the present invention. Referring to FIG. 2, client 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a web browser.

Referring again to FIG. 2, read-only memory ("ROM") 205 is coupled to system bus 202 and includes a basic input/output system ("BIOS") that controls certain basic functions of client 101. Random access memory ("RAM") 206 and disk adapter 207 are also coupled to system bus 202. It should be noted that software components including operating system 203 and application 204 may be loaded into RAM 206, which may be client's 101 main memory for execution. Disk adapter 207 may be an integrated drive electronics ("IDE") adapter that communicates with a disk unit 208, e.g., disk drive.

Client 101 may further include a communications adapter 209 coupled to bus 202. Communications adapter 209 interconnects bus 202 with an outside network (e.g., network 103 of FIG. 1) thereby enabling client 101 to communicate with other clients 101 and server 102.

I/O devices may also be connected to client 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client 101 through keyboard 212 or mouse 213 and receiving output from client 101 via display 215 or speaker 214.

Figure 3:
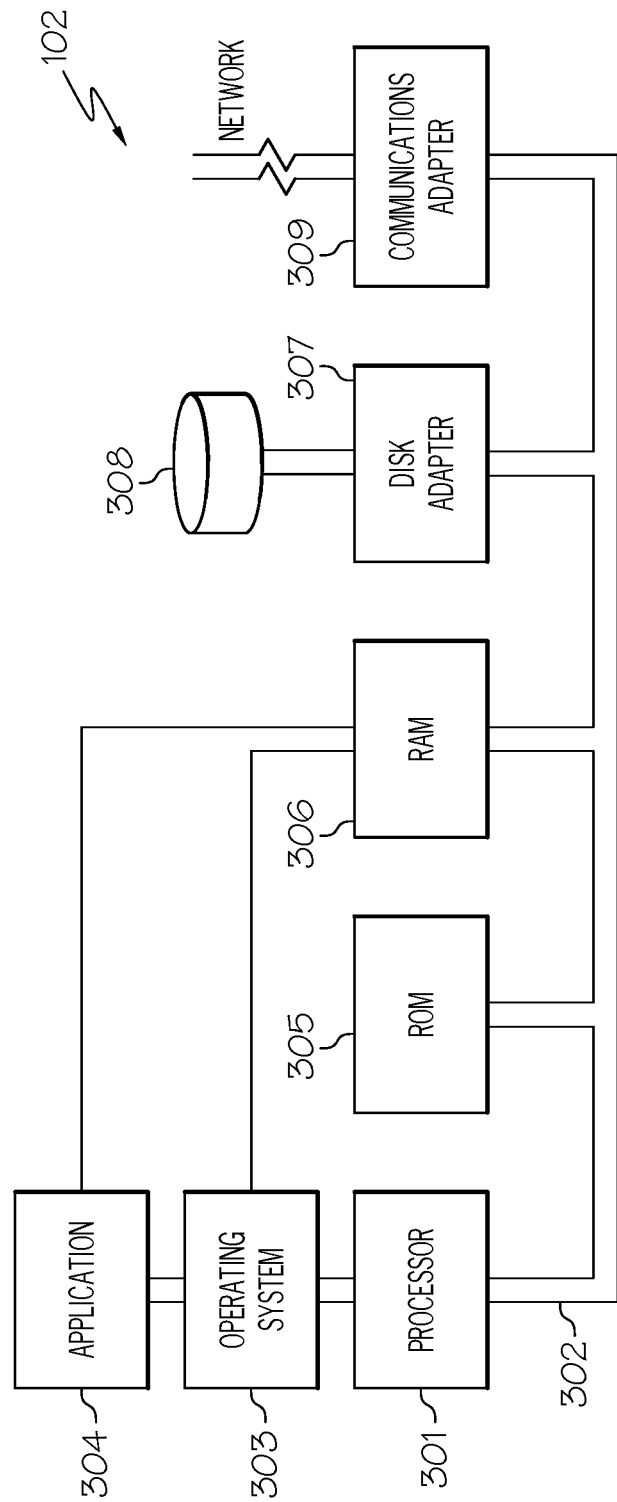
FIG. 3 illustrates a hardware configuration of a server in accordance with an embodiment of the present invention.

Referring now to FIG. 3, FIG. 3 illustrates a hardware configuration of server 102 (FIG. 1) which is representative of a hardware environment for practicing the present invention. Server 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for optimizing the loading of a web page as discussed further below in association with FIGS. 4-7.

Referring again to FIG. 3, read-only memory ("ROM") 305 is coupled to system bus 302 and includes a basic input/output system ("BIOS") that controls certain basic functions of server 102. Random access memory ("RAM") 306 and disk adapter 307 are also coupled to system bus 302. It should be noted that software components including operating system 303 and application 304 may be loaded into RAM 306, which may be server's 102 main memory for execution. Disk adapter 307 may be an integrated drive electronics ("IDE") adapter that communicates with a disk unit 308, e.g., disk drive. It is noted that the program for optimizing the loading of a web page, as discussed further below in association with FIGS. 4-7, may reside in disk unit 308 or in application 304.

Server 102 may further include a communications adapter 309 coupled to bus 302. Communications adapter 309 interconnects bus 302 with an outside network (e.g., network 103 of FIG. 1) thereby enabling server 102 to communicate with client 101 (FIG. 1).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, a web page is a web document or other web resource that is suitable for the World Wide Web and can be accessed through a web browser and displayed on a user's computing device display. Web pages may be retrieved by the web browser from a remote server, commonly referred to as a "web server." The retrieved web page may in the form of a HyperText Markup Language (HTML) document, which is read and parsed by the browser, such as into the "Document Object Model" tree structure. The browser then loads the elements of the web page (e.g., images) from the web server, such as based on the order that the elements appear in the HTML document. As a result, the user may have to wait for the entire web page to be loaded before the user can see the information they are interested in the web page. For example, when the user accesses a website for a local news television station, the user may only be interested in viewing information regarding the weather and local news. However, the user may have to wait for the entire web page to be loaded before they can view the information regarding the weather and local news if these elements are loaded last. Such a problem is compounded by mobile computing devices, which have slower processing speeds and less memory thereby taking longer to download a web page from a web server and increasing the length of time in which the user may have to wait to view the information of interest. As a result, the current means for loading a web page may cause the user to wait for the entire web page to be loaded, which can be a significant amount of time depending on the connection speed, prior to viewing the information of interest.

Figure 4:
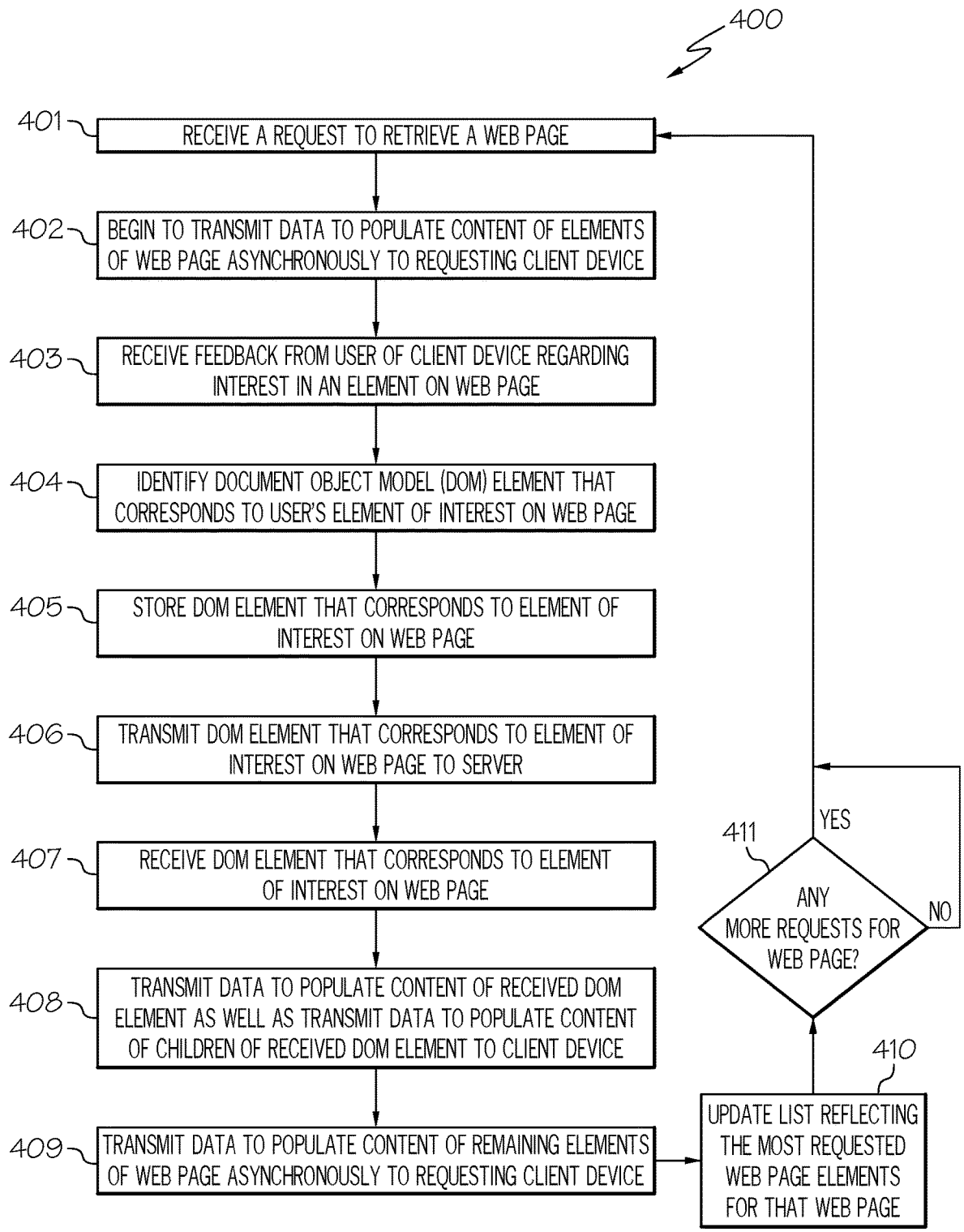
FIG. 4 is a flowchart of a method for optimizing the loading of a web page in accordance with an embodiment of the present invention.
Figure 5:
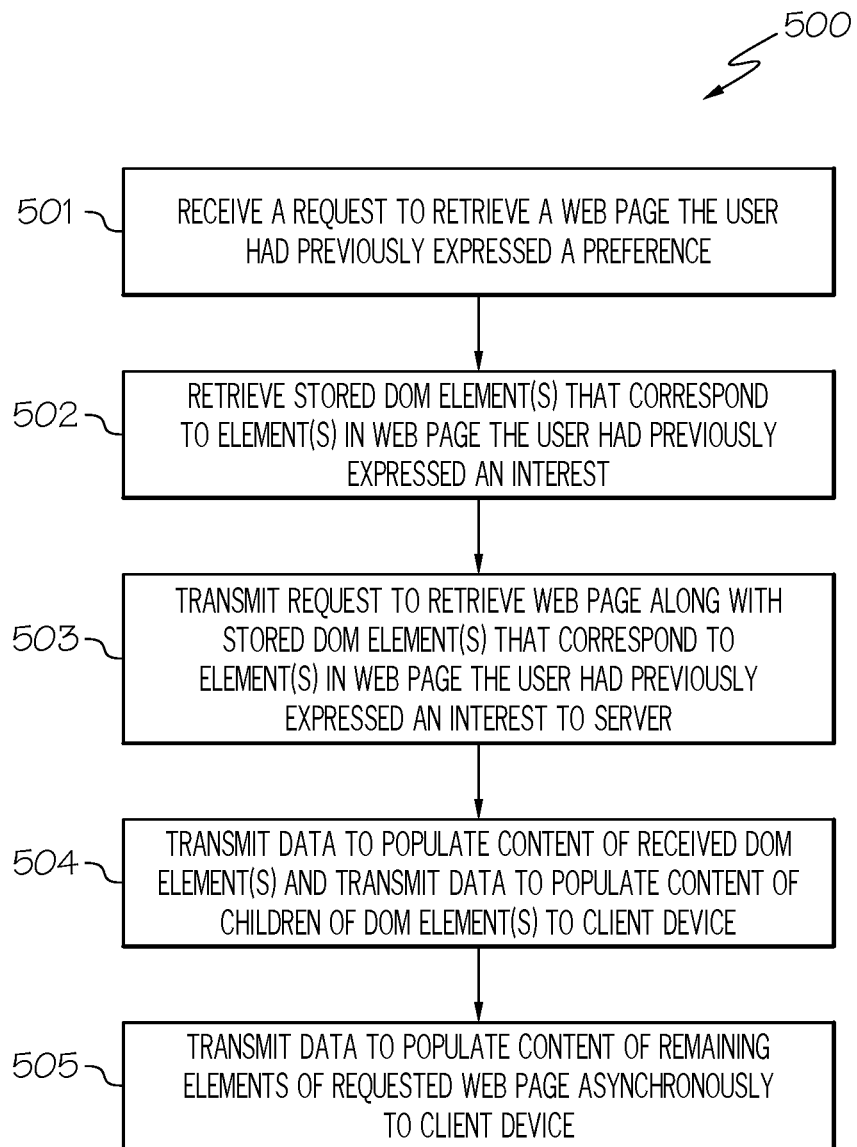
FIG. 5 is a flowchart of a method for retrieving a web page, where the user had previously expressed an interest in an element(s) on that web page in accordance with an embodiment of the present invention.
Figure 6:
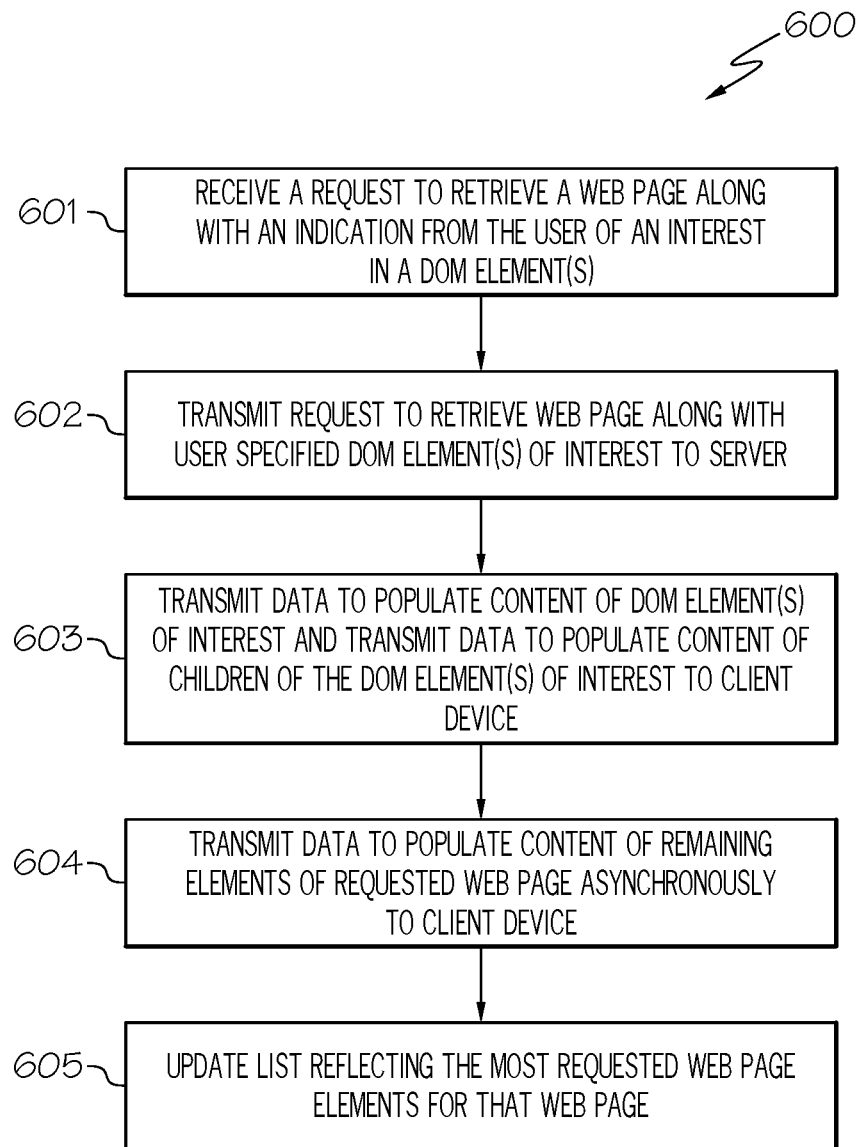
FIG. 6 is a flowchart of a method for retrieving a web page when the user concurrently expresses an element(s) of interest along with the request to retrieve a web page in accordance with an embodiment of the present invention.
Figure 7:
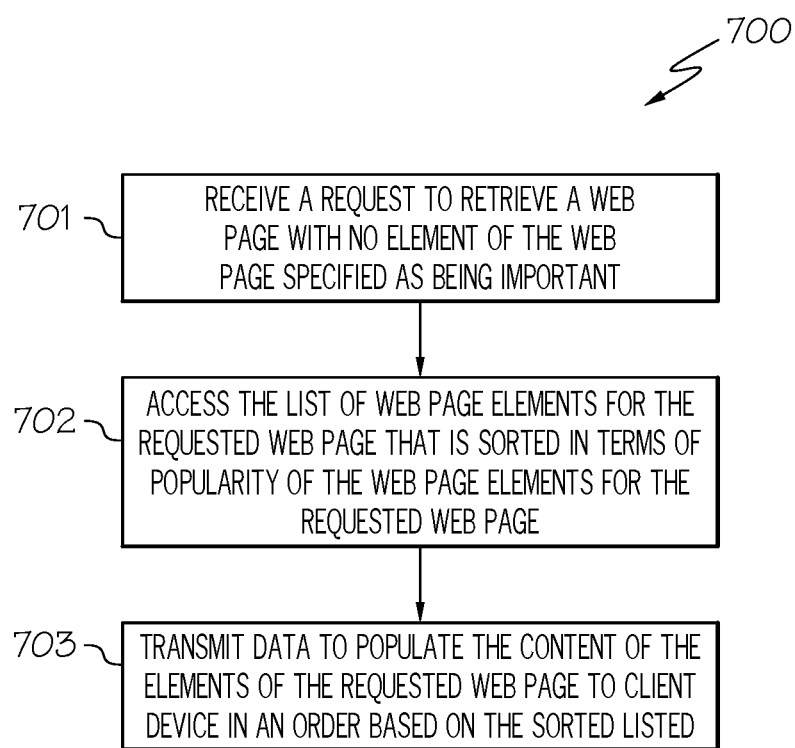
FIG. 7 is a flowchart of a method for retrieving a web page when the user does not express an element of interest for the requested web page in accordance with an embodiment of the present invention.

The principles of the present invention provide a means for loading elements of a web page based on the relative priority of the elements of the web page thereby loading elements of interest prior to elements of non-interest as discussed further below in connection with FIGS. 4-7. FIG. 4 is a flowchart of a method for optimizing the loading of a web page. FIG. 5 is a flowchart of a method for retrieving a web page, where the user had previously expressed an interest in an element(s) on that web page. FIG. 6 is a flowchart of a method for retrieving a web page when the user concurrently expresses an element(s) of interest along with the request to retrieve a web page. FIG. 7 is a flowchart of a method for retrieving a web page when the user does not express an element of interest for the requested web page.

As stated above, FIG. 4 is a flowchart of a method 400 for optimizing the loading of a web page in accordance with an embodiment of the present invention.

Referring to FIG. 4, in conjunction with FIGS. 1-3, in step 401, server 102 receives a request from client device 101 to retrieve a web page. For example, client device 101 may initially receive a request to retrieve a web page from server 102 from the user of client device 101. For instance, the user may type in the Uniform Resource Identifier (URL) in the browser corresponding to the web page to be retrieved from server 102. Client device 101 may then send the request to server 102 to retrieve the requested web page.

In step 402, server 102 begins to transmit the data to populate the content of the elements of the requested web page asynchronously to the requesting client device 101. The browser of client device 101 will then start displaying these elements on display 215 as they are received from server 102.

In step 403, the browser of client device 101 receives feedback from the user of client 101 regarding an interest in a particular element on the requested web page displayed on display 215. For example, the user may indicate an element of interest in the requested web page by selecting an area on the web page. For instance, the user may draw an outline around the element of interest on the web page.

In step 404, the browser of client device 101 identifies the Document Object Model (DOM) element of the DOM tree structure for the requested web page that corresponds to the user's element of interest on the web page. That is, the browser identifies the DOM element that corresponds to the element of interest on the web page that was expressed by the user in step 403.

In step 405, the browser of client device 101 stores the DOM element (e.g., caches the DOM element in a local cache, such as a cache in memory 206) for later retrieval as discussed further below in connection with FIG. 5.

In step 406, the browser of client device 101 transmits an indication (e.g., DOM element) that corresponds to the user's element of interest on the web page to server 102. In one embodiment, client device 101 utilizes an Asynchronous Module Definition (AMD) Application Programming Interface (API) to communicate with server 102 for defining web page elements of interest and their children that can be asynchronously loaded as discussed below.

In step 407, server 102 receives the indication (e.g., DOM element) that corresponds to the user's element of interest on the web page.

In step 408, server 102 transmits the data (e.g., dynamic data, such as a YouTube® video) to populate the content of the received DOM element as well as transmits the data to populate the content of the children of the received DOM element to client device 101.

In step 409, server 102 transmits the data to populate the content of the remaining elements of the web page asynchronously to the requesting client device 101. That is, server 102 transmits the data to populate the content of the remaining DOM elements (and their children) of the DOM tree structure asynchronously to the requesting client device 101 for the requested web page.

In step 410, server 102 updates a list of web page elements for the requesting web page that is sorted in terms of popularity based on the received indication (e.g., DOM element) of a web page element of interest (indication received in step 407) from that user as well as indications received from other users as discussed further below. That is, server 102 updates a list of web page elements for the requesting web page that is sorted based on a number of received DOM elements (corresponding to the users' elements of interest on the web page) for each element on the web page. In one embodiment, such a list is stored in a data storage unit (e.g., memory 306, disk unit 308). In this manner, server 102 maintains a record for the most requested web page elements for that web page. Such a record may be dynamically updated based on the response from other users as discussed below in connection with step 411. As a result, server 102 will be able to transmit to the browser of client device 101 the data to populate the content of the elements of the requested web page based on the relative priority of the elements of the web page as discussed further below in connection with FIG. 7.

The above process (steps 401-410) may be repeated in order for server 102 to obtain additional feedback from other users concerning elements of interest on a web page. By obtaining additional feedback from other users concerning elements of interest on a web page, server 102 will be able to develop a list, which could be in the form of a map, that sorts or identifies elements of interest in the web page based on users' expressed interest for various elements on the web page. In this manner, server 102 will be able to transmit to the browser of client device 101 the data to populate the content of the elements of the requested web page to be loaded by the browser that are higher in interest prior to those of lower in interest thereby optimizing the loading of the web page (i.e., possibly reducing the waiting time for the user to view the element(s) of interest in the requested web page).

Referring to step 411, a determination is made by server 102 as to whether there are any more requests for the web page. If there is another request for the web page, then server 102 receives a request from client device 101 to retrieve the web page in step 401.

If, however, server 102 does not receive a request for the web page, then, server 102 continues to monitor for additional requests for the web page in step 411.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

As discussed above, in connection with method 400, the browser of client device 101 may store the DOM element (e.g., caches the DOM element in a local cache, such as a cache in memory 206) for later retrieval in response to identifying the DOM element of the DOM tree structure that corresponds to the user's element of interest on the web page. In the course of future browsing, the user may return to the same web page where the user has already expressed an interest in an element(s) on that web page as discussed below in connection with FIG. 5.

FIG. 5 is a flowchart of a method 500 for retrieving a web page, where the user had previously expressed an interest in an element(s) on that web page in accordance with an embodiment of the present invention.

Referring to FIG. 5, in conjunction with FIGS. 1-3, in step 501, the browser of client device 101 receives a request to retrieve a web page the user had previously expressed a preference. That is, the browser of client device 101 receives a request to retrieve a web page, where the user had previously expressed an interest in an element(s) on that web page.

In step 502, the browser of client device 101 retrieves the stored DOM element(s) that correspond to the element(s) in the web page the user had previously expressed an interest. As discussed above, the browser of client device 101 stores the DOM element (e.g., caches the DOM element in a local cache, such as a cache in memory 206) for later retrieval in step 405 of method 400 (FIG. 4) in response to identifying the DOM element of the DOM tree structure that corresponds to the user's element of interest on the web page.

In step 503, the browser of client device 101 transmits the request to retrieve the web page along with the stored DOM element(s) that correspond to the element(s) in the web page the user had previously expressed an interest to server 102.

In step 504, server 102 transmits the data (e.g., dynamic data, such as a YouTube® video) to populate the content of the received DOM element as well as transmits the data to populate the content of the children of the received DOM element(s) to client device 101.

In step 505, server 102 transmits the data to populate the content of the remaining elements of the requested web page asynchronously to the requesting client device 101. That is, server 102 transmits the data to populate the content of the remaining DOM elements (and their children) of the DOM tree structure asynchronously to the requesting client device 101 for the requested web page.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

As previously discussed in connection with FIG. 4, the user may provide feedback concerning an element of interest in the requested web page after the element of interest is displayed on display 215 of client device 101. However, the user may also concurrently express an element(s) of interest along with the request to retrieve a web page as discussed below in connection with FIG. 6.

FIG. 6 is a flowchart of a method 600 for retrieving a web page when the user concurrently expresses an element(s) of interest along with the request to retrieve a web page in accordance with an embodiment of the present invention.

Referring to FIG. 6, in conjunction with FIGS. 1-3, in step 601, the browser of client device 101 receives a request to retrieve a web page along with an indication from the user of an interest in a DOM element(s).

In step 602, the browser of client device 101 transmits the request to retrieve the web page along with the user specified DOM element(s) of interest to server 102.

In step 603, server 102 transmits the data to populate the content of the DOM element(s) of interest as well as transmits the data to populate the content of the children of the DOM element(s) of interest to client device 101.

In step 604, server 102 transmits the data to populate the content of the remaining elements of the requested web page asynchronously to the requesting client device 101. That is, server 102 transmits the data to populate the content of the remaining DOM elements (and their children) of the DOM tree structure asynchronously to the requesting client device 101 for the requested web page.

In step 605, server 102 updates a list of elements for the requesting web page that is sorted in terms of popularity based on the received DOM elements corresponding to the user's elements of interest on the web page. That is, server 102 updates a list that reflects the most requested web page elements for that web page.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

Upon establishing a list that reflects the most requested web page elements for that web page, server 102 may appropriately respond with transmitting to the browser of client device 101 the data to populate the content of elements of higher interest prior to the elements of lower interest in the requested web page to be loaded by the browser thereby optimizing the loading of the web page (i.e., possibly reducing the waiting time for the user to view the element(s) of interest in the requested web page) as discussed below in connection with FIG. 7.

FIG. 7 is a flowchart of a method 700 for retrieving a web page when the user does not express an element of interest for the requested web page in accordance with an embodiment of the present invention.

Referring to FIG. 7, in conjunction with FIGS. 1-3, in step 701, server 102 receives a request to retrieve a web page with no element of the web page specified as being important from client device 101.

In step 702, server 102 accesses the list of web page elements for the requested web page that is sorted in terms of popularity of the web page elements for the requested web page.

In step 703, server 102 transmits the data to populate the content of the elements of the requested web page to client device 101 in an order based on the sorted listed. In this manner, server 102 transmits to client device 101 the data to populate the content of the elements of higher interest prior to the elements of lower interest in the requested web page thereby optimizing the loading of the web page (i.e., possibly reducing the waiting time for the user to view the element(s) of interest in the requested web page).

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for optimizing the loading of a web page, the computer program product comprising a computer readable storage medium having program code embodied therewith, the program code comprising programming instructions for:
   receiving, by a server, a request to retrieve a web page along with a Document Object Model (DOM) element that corresponds to an element in said web page a user had previously expressed an interest from a computing device of said user, wherein a browser of said computing device of said user had previously received feedback from said user regarding an interest in said element in said web page, wherein said browser of said computing device of said user identifies said DOM element of a DOM tree structure for said requested web page that corresponds to said user's element of interest on said web page;
   transmitting data to said computing device of said user to populate content of said received DOM element as well as transmitting data to said computing device of said user to populate content of children of said received DOM element; and
   transmitting data to said computing device of said user to populate content of remaining elements of said requested web page asynchronously.

2. The computer program product as recited in claim 1, wherein the program code further comprises the programming instructions for:
   updating a list of elements for said requesting web page that is stored in terms of popularity based on said received DOM element corresponding to said user's element of interest on said web page;
   receiving a second request to access said web page from a second computing device of a second user;
   accessing said list of elements for said requesting web page that is sorted in terms of popularity; and
   transmitting data to populate content of said elements of said requested web page to said second computing device of said second user in an order based on said list of elements for said requesting web page that is sorted in terms of popularity.

3. The computer program product as recited in claim 2, wherein said list of elements for said requesting web page is in a form of a map.

4. The computer program product as recited in claim 1, wherein the program code further comprises the programming instructions for:
   receiving indications of web page elements of interest of said web page from a plurality of client devices; and
   forming a list of web page elements of said web page sorted in terms of popularity based on said received indications of web page elements of interest of said web page.

5. The computer program product as recited in claim 4, wherein said indications of web page elements of interest of said web page are expressed as Document Object Model (DOM) elements.

6. The computer program product as recited in claim 5, wherein the program code further comprises the programming instructions for:
   updating said list of web page elements of said web page that is sorted based on a number of received DOM elements for each element of said web page.

7. The computer program product as recited in claim 1, said user expresses an interest in said element of said web page by drawing an outline around said element of interest on said web page.

8. The computer program product as recited in claim 1, wherein said DOM element that corresponds to said user's element of interest on said web page is stored in a cache of said computing device of said user.

9. The computer program product as recited in claim 1, wherein the program code further comprises the programming instructions for:
   updating a list of elements for said requesting web page that is stored in terms of popularity based on said received DOM element corresponding to said user's element of interest on said web page.

10. The computer program product as recited in claim 1, wherein said computing device of said user utilizes an asynchronous module definition application programming interface to communicate with said server for defining said element of interest of said web page and its children to be asynchronously loaded.

11. A server, comprising:
    a memory for storing a computer program for optimizing loading of a web page; and
    a processor connected to said memory, wherein said processor is configured to execute program instructions of the computer program comprising:
       receiving a request to retrieve the web page along with a Document Object Model (DOM) element that corresponds to an element in said web page a user had previously expressed an interest from a computing device of said user, wherein a browser of said computing device of said user had previously received feedback from said user regarding an interest in said element in said web page, wherein said browser of said computing device of said user identifies said DOM element of a DOM tree structure for said requested web page that corresponds to said user's element of interest on said web page;
       transmitting data to said computing device of said user to populate content of said received DOM element as well as transmitting data to said computing device of said user to populate content of children of said received DOM element; and
       transmitting data to said computing device of said user to populate content of remaining elements of said requested web page asynchronously.

12. The server as recited in claim 11, wherein the program instructions of the computer program further comprise:
    updating a list of elements for said requesting web page that is stored in terms of popularity based on said received DOM element corresponding to said user's element of interest on said web page;
    receiving a second request to access said web page from a second computing device of a second user;
    accessing said list of elements for said requesting web page that is sorted in terms of popularity; and transmitting data to populate content of said elements of said requested web page to said second computing device of said second user in an order based on said list of elements for said requesting web page that is sorted in terms of popularity.

13. The server as recited in claim 12, wherein said list of elements for said requesting web page is in a form of a map.

14. The server as recited in claim 11, wherein the program instructions of the computer program further comprise:
receiving indications of web page elements of interest of said web page from a plurality of client devices; and
forming a list of web page elements of said web page sorted in terms of popularity based on said received indications of web page elements of interest of said web page.

15. The server as recited in claim 14, wherein said indications of web page elements of interest of said web page are expressed as Document Object Model (DOM) elements.

16. The server as recited in claim 15, wherein the program instructions of the computer program further comprise:
updating said list of web page elements of said web page that is sorted based on a number of received DOM elements for each element of said web page.

17. The server as recited in claim 11, wherein said user expresses an interest in said element of said web page by drawing an outline around said element of interest on said web page.

18. The server as recited in claim 11, wherein said DOM element that corresponds to said user's element of interest on said web page is stored in a cache of said computing device of said user.

19. The server as recited in claim 11, wherein the program instructions of the computer program further comprise:
updating a list of elements for said requesting web page that is stored in terms of popularity based on said received DOM element corresponding to said user's element of interest on said web page.

20. The server as recited in claim 11, wherein said computing device of said user utilizes an asynchronous module definition application programming interface to communicate with said server for defining said element of interest of said web page and its children to be asynchronously loaded.

* * * * *